United States Patent [19]
Kilmer et al.

[11] 3,797,921
[45] Mar. 19, 1974

[54] PHOTOGRAPHING APPARATUS FOR DETERMINING CORNEAL RADIUS

[76] Inventors: Lauren G. Kilmer; McCabe C. Lively, both of Temco Manufacturing Company, 1826 N. Kingston Pl., Tulsa, Okla. 74115; Alvin E. Reynolds, c/o International Diagnostic Instruments Limited, 3540 E. 31st St., Tulsa, Okla. 74135

[22] Filed: June 5, 1972

[21] Appl. No.: 259,660

[52] U.S. Cl. .................. 351/7, 95/11 EM, 351/13, 351/38, 351/39
[51] Int. Cl. .................. A61b 3/14, G03b 19/02
[58] Field of Search ............ 351/1, 6, 7, 13, 16, 38, 351/39; 95/11 EM

[56] References Cited
UNITED STATES PATENTS

| | | | |
|---|---|---|---|
| 3,598,478 | 8/1971 | Townsley | 351/7 X |
| 3,248,162 | 4/1966 | Knoll | 351/6 |
| 3,264,932 | 8/1966 | Hendricks | 351/16 X |
| 3,542,458 | 11/1970 | Volk | 351/6 X |
| R27,475 | 9/1972 | Volk | 351/6 X |

FOREIGN PATENTS OR APPLICATIONS

| | | | |
|---|---|---|---|
| 137,766 | 7/1960 | U.S.S.R. | 95/11 EM |

*Primary Examiner*—Paul A. Sacher
*Attorney, Agent, or Firm*—Morton, Bernard, Brown, Roberts & Sutherland

[57] ABSTRACT

A camera by means of which a doctor can obtain a picture of the eye of a patient, having superimposed thereon one or more concentric circles, permitting determination by the doctor of the radius of the eye cornea so that a contact lens can be properly fitted. The patient supports his head on a chin rest and looks into an opening in the center of a spherically concave screen, focusing on a light dot. Light from within the camera passes through one or more concentric rings in the concave screen to form light circles on the eye cornea. On a viewing screen on the opposite end of the camera the doctor sees an image of the patient's eye with the circles superimposed thereon. The doctor can adjust the elevation of the patient's eye, the rotational alignment between the camera and the patient, and the focus of the image. When these adjustments are satisfactory, the doctor actuates the device to open the camera shutter and energize flash tubes, exposing film to the image of the patient's eye as had been seen by the doctor. Light from the flash tubes passes through the one or more concentric rings so that one or more light circles appear on the image of the eyeball as photographed on the film. The film is preferably immediately developed within the camera. From the circles on the resulting print, the doctor determines measurements required for the proper fitting of a contact lens.

12 Claims, 10 Drawing Figures

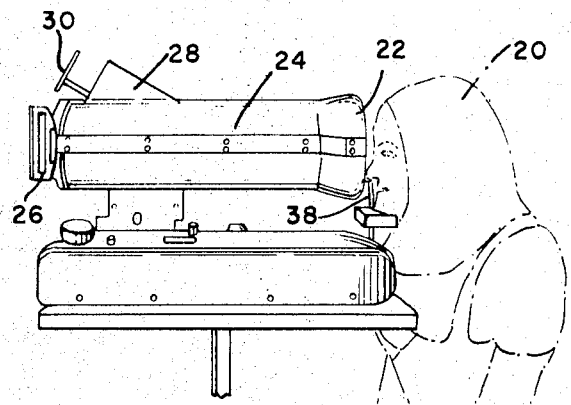
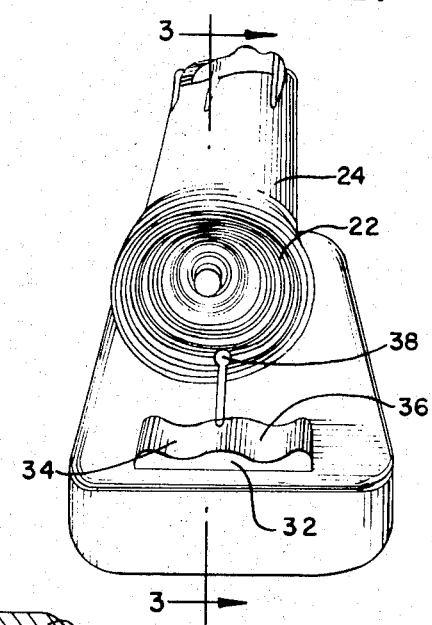
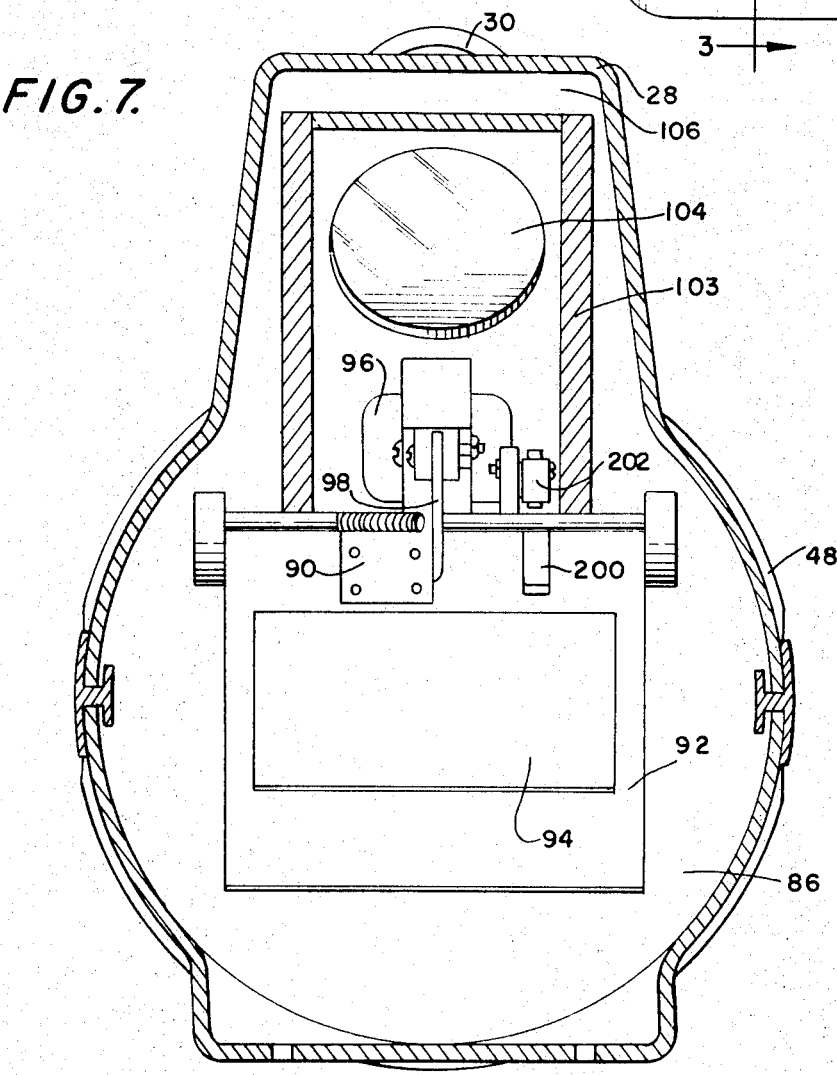

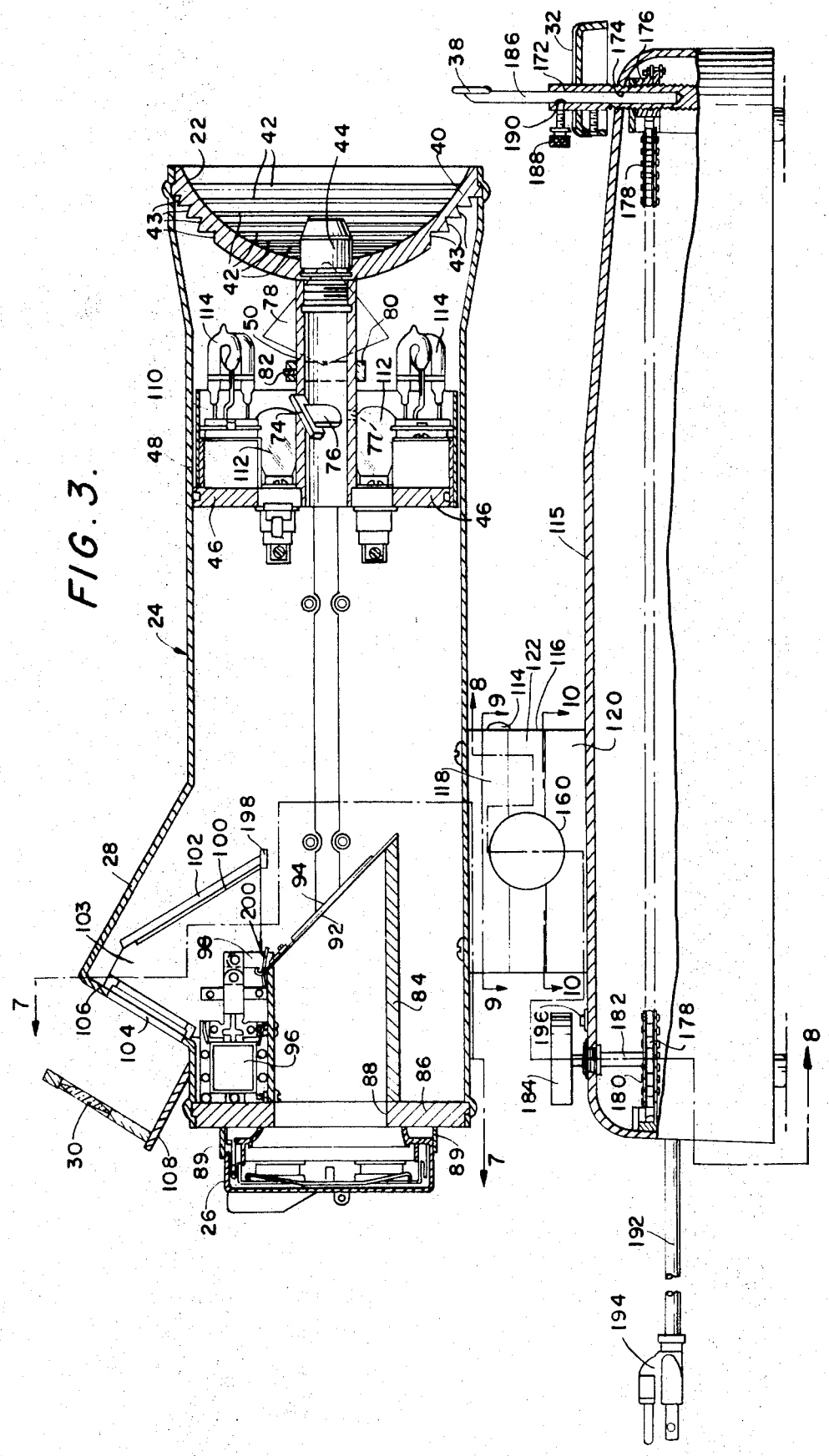

PATENTED MAR 19 1974 3,797,921
SHEET 3 OF 5

PHOTOGRAPHING APPARATUS FOR DETERMINING CORNEAL RADIUS

The present invention pertains to an optical instrument. More particularly, the present invention pertains to apparatus for fitting of contact lenses to the eye of a person.

Many people require corrective lenses to permit them to see properly. A large number of these people wear eye glasses of the type in which lenses are mounted within a frame supported by the nose and ears of the wearer. Numerous other people who require corrective lenses, however, prefer to wear contact lenses which fit on top of the cornea and beneath the eyelid of each eye. These contact lenses must be fitted with extreme accuracy to avoid causing great discomfort to the wearer. Each contact lens when worn is placed on the cornea over one of the wearer's eyeballs. Each eyeball has a substantially spherical surface of a unique diameter. If contact lenses are to be worn for a long period of time, each lense must accurately fit its cornea and must not interfere with the exchange of precorneal fluid over the cornea; otherwise the lenses soon cause discomfort and inflamation, preventing the wearer from seeing, and in extreme cases damaging the eyes.

There recently have been developed photographic techniques for determining the curvature of the corneas of a person being fitted for contact lenses. Typical of these is a device in which light is projected through a plane screen to the eyes of the patient from which the light is reflected. The screen through which the light passes includes translucent rings of various diameters and various widths. The patient is instructed to look at a black dot while the apparatus is adjusted. A picture is then made showing the patient's eye with lighted rings reflected thereon. The negative film of this picture is placed in a projector to cause an enlargement of the picture to appear on a projection screen having a number of circular rings on it. A comparison of the rings on the projection screen with the rings projected from the picture negative is utilized to determine the curvature required for the contact lenses. Many drawbacks exist with this apparatus. The location of the rings on the plane screen must be determined empirically. The black dot on which the patient is asked to focus is in an indistinctly lighted area and is generally so close to the patient's eye that he has difficulty focusing on it. The camera, by means of which the picture is taken, is raised and lowered on a screw mounted stand and is moved horizontally by hand. The camera is operated by hand. These operations cause unsteadiness and often result in unsatisfactory pictures. The projector for the negative film includes essentially a point source of light which is moved toward and away from the film to provide the necessary enlargement. This effort must be done in a dark room because of the low light level in the apparatus. The projector and camera are not standardized and so they cannot be interchanged with other projector and camera devices. Therefore, the calibration of a particular projector with a particular camera must be determined before the two components can be used together. Similar shortcomings exist in other equipment presently available for the fitting of contact lenses.

The present invention is an apparatus for use in the fitting of contact lenses in a manner which overcomes these several shortcomings. In accordance with the present invention, a patient is seated before a camera into the lens of which he looks with one eye while resting his chin on an elevating plate. The lens assembly into which the patient looks is in the center of a spherically concave screen, and the patient focuses on a lighted circle. Light from within the instrument generates one or more concentric rings on the cornea of the patient's eye. The doctor or other operator is at the back of the instrument observing on a frosted window the eye with the concentric rings. The doctor adjusts the patient's head to the desired elevation and adjusts the instrument to the desired horizontal and angular positions until the patient's eye is focused substantially at the center of curvature of the spherically concave screen. One of the concentric rings on the concave screen has a diameter which subtends an angle of 120° at the center of curvature of the concave screen, and so the diameter of the corresponding circle on the patient's cornea is equal to the cornea radius of curvature.

When the patient's eye is properly centered and properly focused, the doctor actuates a control which causes a shutter within the instrument to be moved so that the camera film has focused directly on it the eye as had been seen by the doctor and which energizes one or more flash tubes to expose the film to that view of the patient's eye. The film is developed within the camera to produce a color print within a short time, for example a time in the order of 1 minute. Consequently, should the picture not be satisfactory, the doctor is quickly aware of it and can take another. When a satisfactory picture of the first eye is obtained, the patient moves so that his other eye is in the proper position, and the procedure is repeated.

The diameter on the corena of the circle generated by the ring subtending the 120° angle at the screen center of curvature is determined, for example by placing the resulting pictures one at a time within a second instrument, such as an opaque projector, which projects an enlarged view of the picture onto a screen having on it a plurality of rings of known diameter. This circle diameter is equal to the cornea radius of curvature and is used by the doctor in fitting a contact lens. A projection instrument suitable for this purpose is described and claimed in copending U.S. Pat. application Ser. No. 259,611 filed of even date herewith by Lauren G. Kilmer. The present invention thus aids in the fitting of contact lenses.

These and other aspects and advantages of the present invention are more apparent in the following detailed description and claims, particularly when considered in conjunction with the accompanying drawings in which like parts bear like reference numerals. In the drawings:

FIG. 1 is a side elevational view of apparatus utilized in the fitting of contact lenses in accordance with the present invention;

FIG. 2 is a perspective view of the piece of apparatus of FIG. 1.

FIG. 3 is a sectional view taken along line 3—3 of FIG. 2;

FIG. 7 is a sectional view taken along line 7—7 of FIG. 3;

Figure 4:
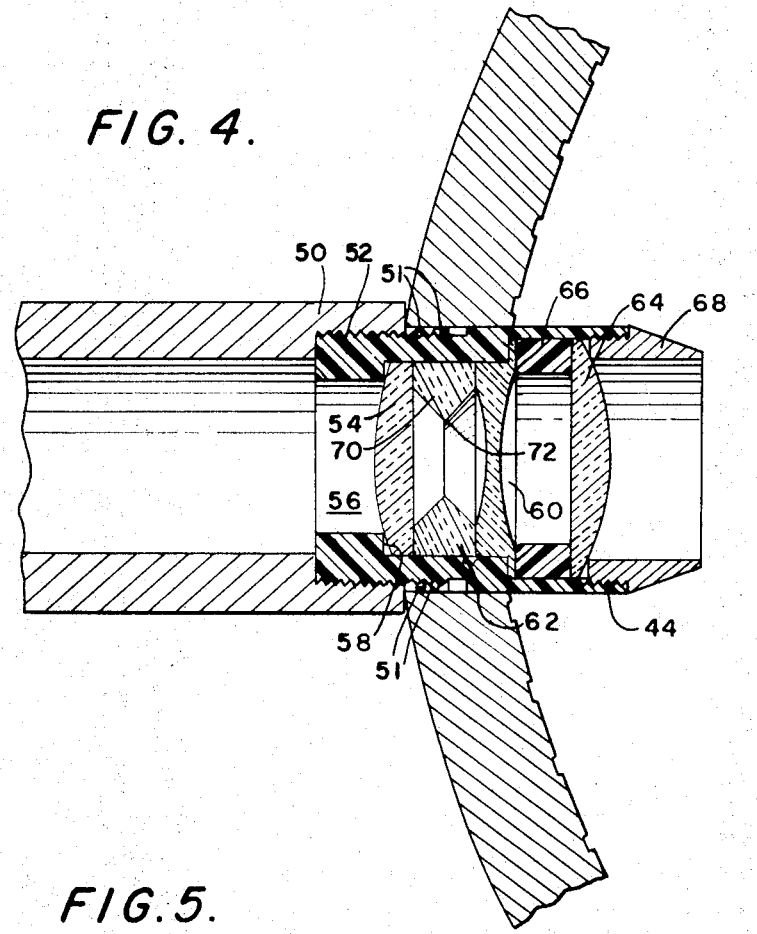
FIG. 4 is an enlarged sectional view of a lens assembly within the apparatus of FIG. 3.

FIG. 1 depicts a patient 20 having his eyes photographed by means of camera 24 in accordance with the present invention. Patient 20 looks into the lens end 22 of camera 24, on the second end of which is mounted film holder 26. Adjacent the second end of camera 24 and intersecting the longitudinal axis thereof at an obtuse angle is viewing chamber 28. If desired, viewing lens 30 can be attached to viewing chamber 28 to aid in the viewing of the viewing screen on chamber 28.

FIG. 2 depicts lens end 22 of camera 24 into which the patient looks. Chin rest 32 is provided, having a first resting area 34 and a second resting area 36 to permit the patient to rest his chin when looking into lens end 22 with the right eye and with the left eye, respectively. Cheek pad 38 extends upwardly from chin rest 32 so that the patient can place his cheek against it while looking into lens end 22.

FIG. 3 depicts the components within camera 24. Focusing screen 40 is positioned at first end 22 of assembly 24. As seen in FIGS. 2 and 3, focusing screen 40 is essentially an opaque spherical segment with a plurality of transparent circles or rings 42 thereon and with its concave surface facing outwardly at lens end 22. Only one properly located circle is required on the print of the patient's eye to permit determination of the cornea radius. In practice, however, a plurality of concentric circles are frequently preferred since they make more apparent in the print the extent to which the cornea surface varies from spherical. The present invention is described with reference to a plurality of concentric circles; however, a camera in accordance with the present invention having but one properly positioned transparent circle 42 would be satisfactory. In addition, in describing the present invention, the outermost concentric circle 42 is described as the circle of interest insofar as determining the radius of curvature of the cornea, but any one of the circles 42 could be utilized so long as it is properly positioned on reflecting screen 40, as more fully discussed hereinafter.

By way of illustration, focusing screen can have a transparent base formed of a polymer of an acrylic acid or an ester thereof, for example polymeric methacrylate such as that commercially available under the trademark Lucite. The outer concave surface of this base is then painted a dark color, and circles 42 are made through the paint, exposing the transparent base. Preferably, the inner convex surface of focusing screen 40 is coated with a light-reflecting layer such as white paint having corresponding rings therethrough to permit passage of light through the rings 42. If desired, to increase the light passing through the outer three or four circles 42, prismatic rings 43 can be made at the corresponding locations on the inner convex surface of focusing screen 40.

Circular disc 46 is mounted to shell 48 of camera 24 and supports incandescent light bulbs 112 within heat shield 110. Disc 46 also supports tube 50 with its longitudinal axis substantially coinciding with the longitudinal axis of shell 48. Lens assembly 44 is threaded into one end of tube 50 and passes through substantially the center of the spherical section of focusing screen 40. Disc 46 and tube 50 thus hold lens assembly 44 in a fixed position relative to film holder 26. FIG. 4 depicts in detail the components of lens assembly 44. Lens holder 52 has its first end threaded to mate with threads on the forward end of tube 50. First lens 54 is positioned against shoulder 58 of chamber 56 within lens holder 52. Second lens 60 is positioned within chamber 56 and is maintained at the desired distance from first lens 54 by means of spacer 62. Spacer 62 includes lens stop 70 which limits the light passing through lens assembly 44. By way of example, lens stop 70 may have an opening 72 with a diameter in the order of five-sixteenth inch. Third lens 64 is positioned in front of lens 60 and is maintained at the desired distance from that lens by means of spacer 66. Retainer 68 is threadedly connected to the forward end of lens holder 52 to retain lenses 54, 60 and 64 and spacers 62 and 66 in the desired positions. Minor focusing adjustments can be made by screwing lens assembly 44 slightly into or out from tube 50. When the desired focusing adjustment is achieved, the position of lens assembly 44 relative to tube 50 is secured by means of lock nuts 51. This initial focusing of camera 24 can be achieved utilizing a ball of known diameter in front of lens end 22 of camera 24. Light from bulbs 112 passing through transparent circles 42 forms concentric circles on the ball, and the position of lens assembly 44 relative to tube 50 is adjusted to bring to proper focus the image of these concentric rings on the viewing screen of viewing chamber 28.

Disc 46 further supports flash tubes 114 which are actuated when a picture is to be made. Light from bulbs 112 and tubes 114 is blocked by disc 46 from the rearward portion of the interior of shell 48.

As seen in FIG. 3, mirror holder 74 is held by tube 50 with mirror 76 within the interior of the tube. A small opening 77, of a diameter in the order of one-eighth inch, is provided in one side of tube 50. Light from bulbs 112 enters through opening 77 to strike mirror 76. Mirror 76 is preferably formed from a thin glass, such as a microscope slide cover having a thickness in the order of 0.006 inch, which reflects approximately four percent of the light striking its front surface and which passes the remainder. This remaining 96% of the light strikes the opposite side of the interior surface of tube 50 and is lost to the system. When a patient is looking into lens assembly 44, he sees a spot of light on mirror 76. This provides a target on which the patient focuses his eye.

Figure 5:
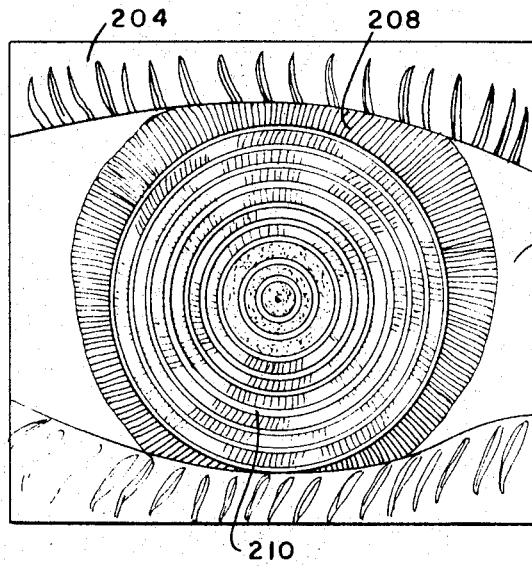
FIG. 5 depicts a positive print of a picture of an eye as made by apparatus in accordance with the present invention.

FIG. 5 depicts a positive print 204 of a photograph of an eye such as provided by camera 24. Print 204 shows eye 206 including cornea 208 having a plurality of circles 210 superimposed thereon. This same view is seen on the viewing screen in viewing chamber 28 when the doctor is focusing camera 24. The circles 210 result from light from bulbs 212 passing through concentric circles 42 of focusing screen 40.

Figure 6:
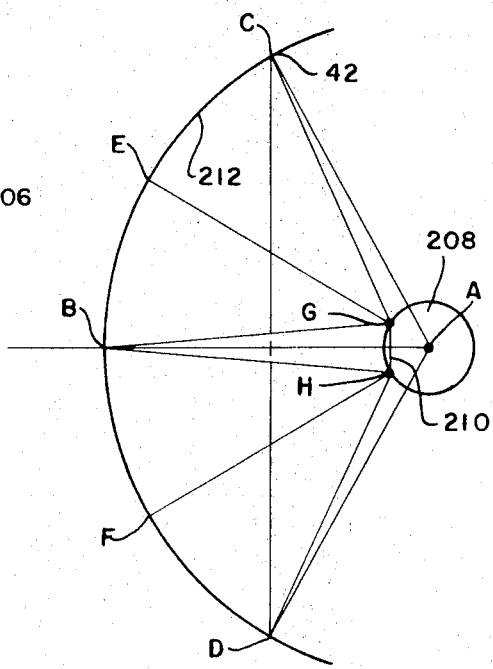
FIG. 6 depicts geometrically the manner of determining the position of the circle on the apparatus of FIG. 3 so that the proper circle image is formed on the patient's cornea.

FIG. 6 shows geometrically the manner in which the placement of the outermost circle 42 is determined so that outermost circle 210 on cornea 208 has a diameter equal to the cornea radius. Curve 212 represents an arc on the inner surface of reflecting screen 40. Screen 40 is a spherical segment having a center of curvature at point A, and so curve 212 is also centered at point A. Line AB is an extension of the longitudinal axis of lens assembly 44. The outermost circle 42 intersects curve 212 at points C and D, and so line CD is a diameter of that outermost ring perpendicular to line AB. Outermost circle 42 is positioned so that angle CAD, the angle subtended at point A by diameter CD, equals 120°, with angle CAB and angle BAD each equaling 60°. The cornea of the patient's eye is substantially spherical. When camera 24 is properly focused on the patient's eye, the patient is positioned so that his cornea 208 is centered about point A. Line AE bisects angle CAB, and line AF bisects angle BAD. Light passing through outermost circle 42 at point C is reflected from cornea 108 at point G, and since the angle of reflection equals the angle of incidence, this reflected light is directed to point B, the opening in focusing screen 40 at which lens assembly 44 is positioned. Likewise, light from the outermost circle 42 at point D is reflected from cornea 208 at point H to point B. Thus, as seen by lens assembly 44, the outermost concentric circle 210 on cornea 208 passes through points G and H. Angle EAB equals 30°, and angle BAF equals 30°; therefore, angle EAF equals 60°. Line GH, the diameter of outermost circle 210, is perpendicular to line AB, and angle EAB equals 30°; therefore, angle AGH equals 60°. Likewise, angle AHG equals 60°, and so, triangle AGH is an equilateral triangle. Thus GH, the diameter of the outermost circle 210 as seen by lens assembly 44, is equal to AG, the cornea radius. Consequently, determination from print 204 of the diameter of the outermost circle 210 results in determination of the cornea radius.

Rather than having cornea 208 centered about point A with camera 24 focused on the front surface of the cornea, it may be preferred to focus camera 24 on point A so that when the camera is properly focused on cornea 13, the cornea is centered about a point slightly behind point A, having the cornea front surface at point A. Sufficiently accurate results are obtained. Camera 24 is thus focused in the vicinity of point A.

As seen in FIGS. 3 and 7, rectangular tube 84 extends from end member 86 and within shell 48 with the longitudinal axis of tube 84 substantially coinciding with the longitudinal axis of shell 48. The forward end of tube 84 is beveled at an angle in the order or 45°. Hinge 90 is connected to the upper forward edge of tube 84 and supports mirror holder 92 on the forward surface of which is mirror 94. The beveling of the forward end of tube 84 results in mirror holder 92 and mirror 94 being inclined at an angle of substantially 45° with respect to the longitudinal axis of shell 48. Solenoid 96 is positioned adjacent tube 84 and has its actuating arm 98 coupled to mirror support 92.

Mirror 100 is supported by mirror holder 102 which is attached by frame 103 to shell 48 so that mirror 100 is inclined at a suitable angle with respect to the axis of shell 48 and is located within viewing chamber 28. Viewing screen 104 is positioned within rearward end 106 of viewing chamber 28. If desired to aid in viewing images on viewing screen 104, viewing lens 30 can be held by arm 108 so that lens 30 is substantially parallel with viewing screen 104. Viewing screen 104 is a clear screen having a diffusing surface upon which an image can be focused. Mirrors 94 and 100 are preferably first surface aluminized glass which prevents secondary reflections.

When a patient is positioned with his eye focusing on the light dot image on mirror 76 a view of that patient's eye with concentric circles 210 superimposed thereon is reflected by mirror 94 to mirror 100 which in turn reflects the image to viewing screen 104. The doctor or other operator can thus see this view of the patient's eye projected on viewing screen 104.

Opening 88 passes through end member 86, and film holder 26 is held by mount 89 adjacent end member 86 and outside shell 48. Film holder 26 holds film adjacent opening 88 so that the film is exposed to the interior of shell 48. Film holder 26 includes means for advancing the film and means for rapidly making a positive print of exposed film. By way of example, film holder 26 can be made from a camera assembly having these capabilities, such as commercially available under the trademark Polaroid, with the camera assembly lens and shutter removed and replaced by shell 48 and its internal components. With mirror 94 in the position depicted in FIG. 3, film within film holder 26 is blocked by mirror holder 92 from exposure through lens assembly 44 to the eye of a patient.

As seen in FIGS. 3, 8, 9, and 10, shell 48 is mounted upon base 115 by means of support column 116 which is made up of upper member 118 attached to shell 48, lower member 120 attached to base 115, and central member 122. Each member 118, 120 and 122 is annular, and the central openings in the three members are aligned to provide central opening 124 in support column 116. Upper member 118 has in its lower surface a circular, centrally located depression 126 into which dove tail 128 on the upper surface of central member 122 fits to form a V guide. Additionally, a rectangular recess 130 is provided in the lower surface of upper member 118 extending forwardly from central opening 124. A stop bar 132 is attached by means of set screw 134 to central member 122 and within recess 130. Threaded openings 136 are provided on opposite sides of depression 126 in upper member 118. A grip pin 138 is provided within each opening 136 and is held by a set screw 140 so that the tip of grip pin 138 fits within depression 126 and acts against the angled surface of dove tail 128 to retain upper member 118 and central member 122 together while permitting rotational movement therebetween.

Threaded opening 142 extends from recess 130 out one side of upper member 118. Control knob 144 is provided with a threaded rod 146 extending into and threadedly mating with opening 142. Rod 146 extends into recess 130 and acts against stop bar 132. Threaded opening 148 extends from recess 130 out the other side of upper member 118, opposite threaded opening 142. Biasing means such as a spring 150 is provided within opening 148 and is held in place by set screw 152. Spring 150 acts against the second side of stop bar 132. Spring 150 urges stop bar 132 against rod 146. Rotation of control knob 144 causes threaded rod 146 to move into or out from upper member 118. The tip of threaded rod 146 acts against stop bar 132 causing the stop bar to move against the urging of spring 150 as control knob 144 is rotated. Thus, this mechanism controls the rotational alignment of shell 48 and base 115.

Figure 8:
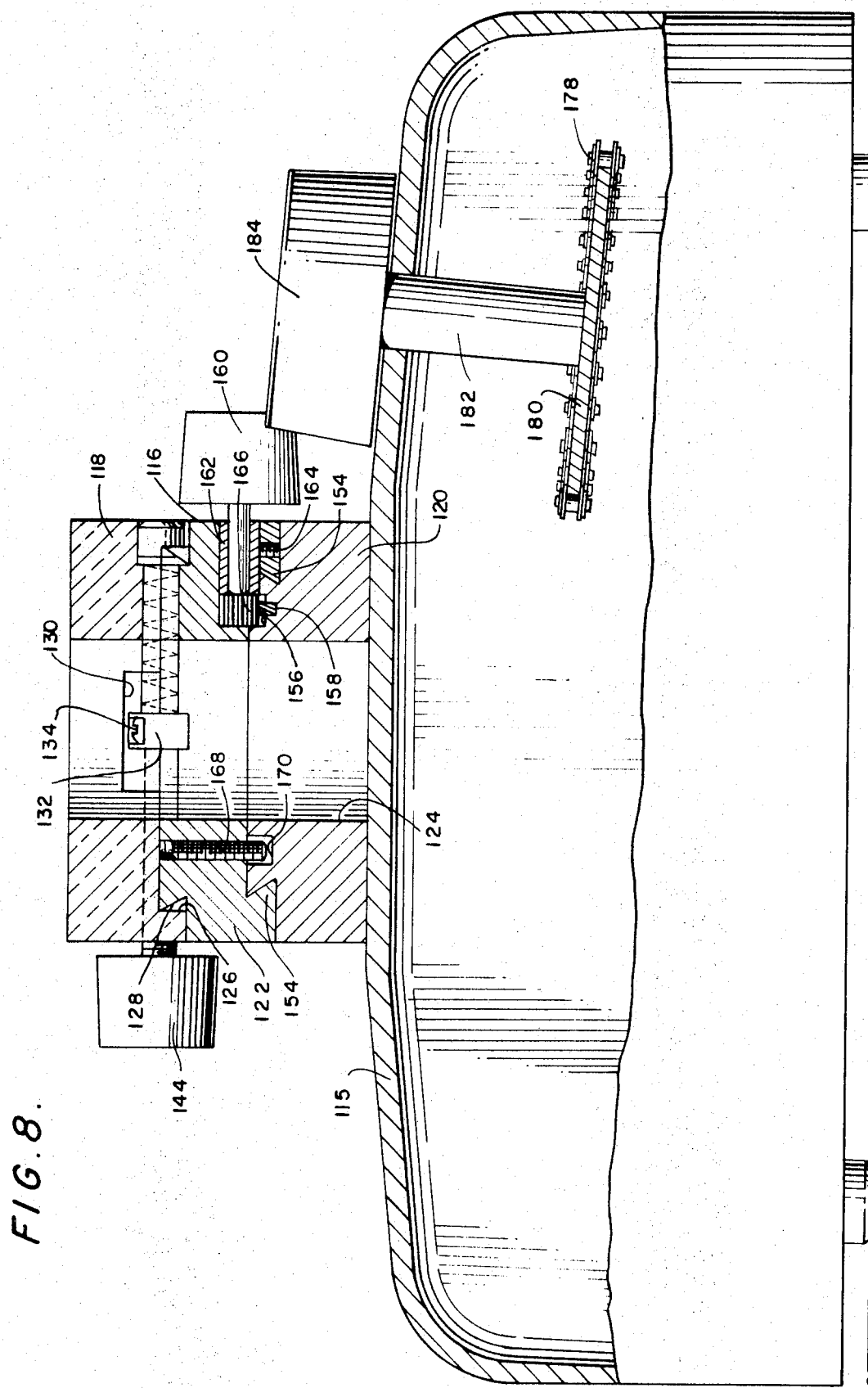
FIG. 8 is a sectional view taken along line 8—8 of FIG. 3.
Figure 9:
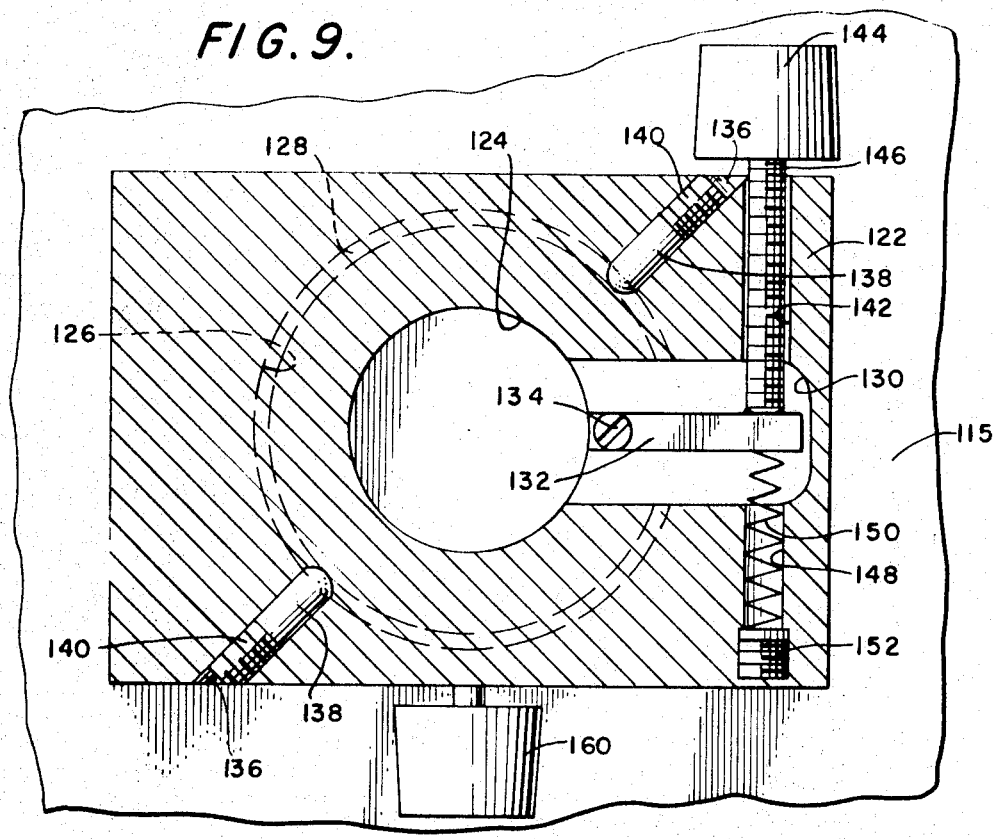
FIG. 9 is a sectional view taken along line 9—9 of FIG. 3.
Figure 10:
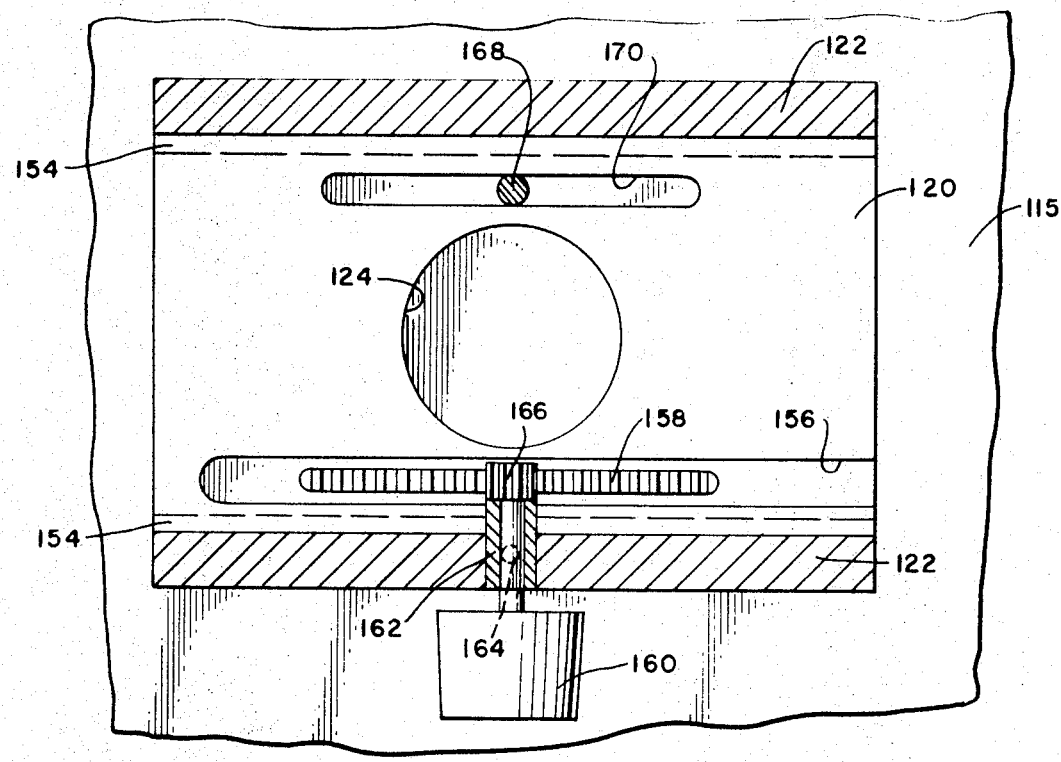
FIG. 10 is a sectional view taken along line 10—10 of FIG. 3.

The horizontal alignment of shell 48 and base 115 is determined by lower member 120 and center member 122 of support column 116, as seen in FIGS. 3, 8 and 10. The lower surface of center member 122 and the upper surface of lower member 120 mate together by means of V guides 154 adjacent either edge of support column 116. Groove 156 is formed in the upper surface of lower member 120 adjacent one edge thereof. Rack 158 is embedded within groove 156. control knob 160 is held within center member 122 by means of sleeve 162 which in turn is held stationary by set screw 164. Knob 160 controls pinion 166 which mates with rack 158. Set screw 168 passes through center member 122 and fits within groove 170 in lower member 120, limiting the relative movement of members 122 and 120 so that they can not come apart. Thus, by means of control knob 160, the horizontal alignment of shell 48 and base 115 is controlled.

Chin rest 32 is connected to hollow rod 172 which extends into opening 174 of base 115. Threaded sprocket 176 is held within base 115 to receive mating threads on rod 172. Chain 178 couples threaded sprocket 176 with sprocket 180 which is attached by shaft 182 to control knob 184 adjacent the rear of base 115. Thus, rotation of control knob 184 causes threaded sprocket 176 to rotate, raising or lowering chin rest 32. Cheek pad 38 is connected to rod 186 which fits within the central opening of hollow rod 172. Thumb screw 188 fits into threaded opening 190 of rod 172 to clamp rod 186 with cheek pad 38 at the desired elevation.

The necessary electrical components are housed within base 115 and are provided with power through cord 192 and plug 194 which fits a conventional electrical outlet. The necessary electrical connections from the components within base 115 to the components within shell 48 is made by means of conductors passing through the central opening 124 of support column 116. Set screw 168 and groove 170 limit the movement of members 120 and 122 so that these conductors are not broken.

When it is desired to utilize this piece of equipment in the fitting of contact lenses, the patient places his chin on one of the resting areas 34 and 36 of chin rest 32, and the doctor or other operator adjusts cheek pad 38 to the desired position so that the patinet can rest his cheek against it, thus retaining a stable position. The patient then looks with one eye into lens assembly 44, focusing on the light spot formed by light through opening 77. The doctor or other operator sees on viewing screen 104 an image of the patient's eye. The doctor adjusts control knobs 144, 160 and 184 to obtain the optimum alignment, focusing and elevation. Lens assembly 44 causes optimum focus to be achieved when the patient's cornea is in the vicinity of the center of curvature of reflection screen 40. When the desired focus is achieved, the operator depresses control 196 to actuate camera 24. The electrical circuitry within base 115 energizes solenoid 96 to lift mirror support 92 and mirror 94 from the optical path. Mirror support 92 comes to rest against bumper 198 to block light from reaching film holder 26 through viewing screen 104. The view of the patient's eye as seen by the doctor on viewing screen 104 is then focused on the film within film holder 16. The length of the optical path from lens assembly 44 to viewing screen 104 is the same as that of the optical path from lens assembly 44 to the film, and so the correct focus is obtained on viewing screen 104.

When mirror support 92 comes to rest against bumper 198, finger 200 actuates switch 202 to provide excitation to flash tubes 114. Light from flash tubes 114 passes through transparent rings 42 on focusing screen 40 to form concentric rings 210 on the image of cornea 208 that reaches the film within film holder 26. Mirror 78 distributes the light from tubes 114 evenly about the interior surface of focusing screen 40. Film holder 26 is actuated to develop positive print 204 of the picture resulting from the exposure of film within the film holder to this image and to advance the film. The developing of print 204 might take about 1 minute, for example. Once flash tubes 114 have been actuated, solenoid 96 is deenergized, returning mirror holder 92 and mirror 94 to the position of FIG. 3. Preferably, solenoid 96 is actuated by voltage that has been stored on a capacitor so that mirror 94 is raised for a fixed time regardless of how long control 196 is depressed, for example a time in the order of one-half second. Mirror holder 92 acts as the shutter of camera 24, controlling the time that film within film holder 26 is in the optical path from lens assembly 44. Since disc 46 blocks the light of bulbs 112 from film holder 26, the brief illumination time of flash tubes 114 controls the exposure of the film.

If picture 104 is not satisfactory, the procedure can be repeated. Since the quality of the picture is determined before the patient leaves the doctor's office, there is no necessity of the patient returning for another picture. If picture 204 is satisfactory, then the patient moves his chin to the other resting area 34 or 36 of chin rest 32 to look into lens assembly 44 with his other eye, and the procedure is repeated for that eye.

Once the doctor has obtained suitable pictures, he can use them to determine the radius of curvature and other parameters required for properly fitting contact lenses. Since the distance from film holder 26 to the center of curvature of reflecting screen 40 is fixed, and since the characteristics of lens assembly 44 are fixed, picture 204 is at a fixed scale. Consequently, measurement of the diameter of outermost circle 210 determines the radius of curvature of cornea 208. An opaque projector having on its viewing screen a plurality of concentric circles with diameters correlated to the diameters of concentric circles 210 could be utilized for this purpose. A suitable projector is the subject of copending U.S. Pat. application Ser. No. 259,611 filed of even date herewith by Lauren G. Kilmer.

Each of the subassemblies within camera 24 is removable as a unit. Thus, the film holder, shutter, viewing screen subassembly, the light, focusing screen subassembly, and the electronics subassembly within base 115 each can be removed as a unit, making them interchangeable.

although the present invention has been described with reference to a preferred embodiment, numerous rearrangements and modifications could be made, and still the result would be within the scope of the invention.

What is claimed is:

1. Apparatus adapted for making a picture of an eye of a patient comprising:
    a housing having a first end and a second end;
    light source means within said housing and adjacent said housing first end;

a focusing screen in the form of an opaque spherical segment having its concave surface as the exterior surface of said housing in said housing first end and having a transparent circle thereon for passage therethrough of light from said light source means to form on the eye of a patient whose eye is adjacent the opaque spherical surface center of curvature an image of a circle, the diameter of the focusing screen transparent circle subtending an angle of 120° at the center of curvature of the opaque spherical segment;

support means for supporting the head of a patient with the cornea of an eye of the patient adjacent the opaque spherical segment center of curvature, such that the center of said cornea is substantially coincident with the center of curvature of said opaque spherical segment;

a film holder for holding film adjacent said housing second end with the film exposed to the interior of said housing;

a viewing screen in said housing second end;

shutter means intermediate said housing first end and said housing second end and cooperating with said housing to define a first optical path from said housing first end, through said housing, to said viewing screen and a second optical path from said housing first end through said housing to said film holder, said shutter means movable between a first shutter position in which said first optical path is unblocked while said second optical path is blocked and a second shutter position in which said first optical path is blocked while said second optical path is unblocked to expose film within said film holder to the area adjacent said opaque spherical segment center of curvature; and actuation means for moving said shutter means between the first shutter position and the second shutter position.

2. Apparatus as claimed in claim 1 in which said support means includes a base member and mounting means for mounting said housing on said base member while permitting rotational and longitudinal movement between said housing and said base member.

3. Apparatus as claimed in claim 2 in which said support means further includes a chin rest for supporting the chin of a patient and means for adjusting the height of said chin rest relative to said housing first end.

4. Apparatus as claimed in claim 1 in which said light source means includes:

first light means for forming within said housing and adjacent said housing first end a target upon which a patient adjacent said housing first end can focus his eye and cooperating with said focusing screen transparent circle to form on the eye of a patient whose eye is adjacent said housing first end, an image of a circle to permit focusing of said apparatus; and second light means responsive to movement of said shutter means from the first shutter position to the second shutter position for providing a flash of light and cooperating with said focusing screen transparent circle to form on the eye of a patient whose eye is adjacent said housing first end an image of a circle to permit exposure of film within said film holder to the eye and circle image.

5. Apparatus as claimed in claim 4 in which said first light means includes a reflective surface and means for projecting onto said reflective surface a spot of light to cause reflection of the spot of light toward said housing first end to form the target.

6. Apparatus as claimed in claim 1 in which the opaque spherical segment has a plurality of concentric transparent circles thereon for passage therethrough of light from said light source means to form on the eye of a patient whose eye is adjacent said housing first end an image of a plurality of concentric circles.

7. Apparatus as claimed in claim 6 in which the diameter of the outermost concentric transparent circle subtends an angle of 120° at the center of curvature of the spherical segment.

8. Apparatus as claimed in claim 1 further comprising lens means intermediate said housing first end and said shutter means for focusing on said viewing screen and on film within said film holder an image of objects in the vicinity of the center of curvature of the opaque spherical segment.

9. Apparatus as claimed in claim 1 in which said film holder includes means for developing exposed film therein to form a positive print of images formed on the exposed film.

10. Apparatus as claimed in claim 1 in which said shutter means includes mirror means cooperating with said housing to define one of the optical paths.

11. Apparatus as claimed in claim 10 in which said mirror means cooperates with said housing to define the first optical path.

12. Apparatus as claimed in claim 1 in which said shutter means cooperates with said housing to define the first and second optical paths with equal path lengths.

* * * * *